United States Patent
Ramamoorthy et al.

(10) Patent No.: US 7,999,542 B2
(45) Date of Patent: Aug. 16, 2011

(54) METHOD FOR DETERMINING FORMATION PARAMETER

(75) Inventors: Raghu Ramamoorthy, Pune (IN); David C. Bradley, Abu Dhabi (AE); Cosan Ayan, Istanbul (TR)

(73) Assignee: Schlumberger Technology Corporation, Sugar Land, TX (US)

( * ) Notice: Subject to any disclaimer, the term of this patent is extended or adjusted under 35 U.S.C. 154(b) by 246 days.

(21) Appl. No.: 12/433,119

(22) Filed: Apr. 30, 2009

(65) Prior Publication Data
US 2010/0277166 A1 Nov. 4, 2010

(51) Int. Cl.
*G01V 3/00* (2006.01)
(52) U.S. Cl. .......................................... 324/303; 73/155
(58) Field of Classification Search .................. 324/303, 324/306; 73/155, 152.41
See application file for complete search history.

(56) References Cited

U.S. PATENT DOCUMENTS

| | | |
|---|---|---|
| 3,562,523 A | 2/1971 | Richardson et al. |
| 3,748,474 A | 7/1973 | Murphy |
| RE28,963 E | 9/1976 | Fertl et al. |
| 4,022,276 A * | 5/1977 | Dreher et al. ............ 166/250.01 |
| 4,420,975 A * | 12/1983 | Nagel et al. ................. 73/152.41 |
| 4,622,463 A * | 11/1986 | Hill ............................... 250/259 |
| 4,987,368 A | 1/1991 | Vinegar |
| 5,796,252 A | 8/1998 | Kleinberg et al. |
| 2006/0000606 A1 | 1/2006 | Fields et al. |
| 2010/0126717 A1* | 5/2010 | Kuchuk et al. ........... 166/250.03 |

OTHER PUBLICATIONS

Cassou, G., et al. Movable oil saturation evaluation in an ultra-mature carbonate environment, Society of Petrophysicists and Well Log Analysts 1st Annual Middle East Regional Symposium, Abu Dhabi, UAE, Apr. 2007, pp. 1-16.

* cited by examiner

*Primary Examiner* — Louis M Arana

(57) ABSTRACT

A method of measuring a parameter characteristic of a rock formation in an oil well is provided for evaluating a reservoir treatment applied to a subterranean formation including the steps of injecting from a tool body suspended into a well at an injection location a known volume of fluid into the formation, performing a logging operation sensitive to a change of fluid content at several measuring points below and above the injection location; and using results of the logging operation to determine a depth profile along said well of a parameter related to fluid content.

9 Claims, 4 Drawing Sheets

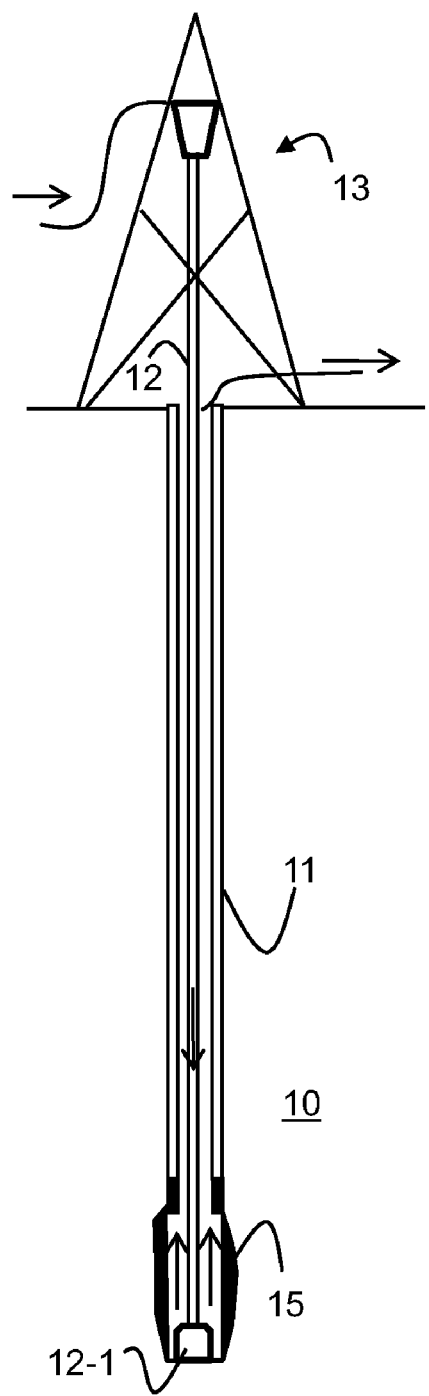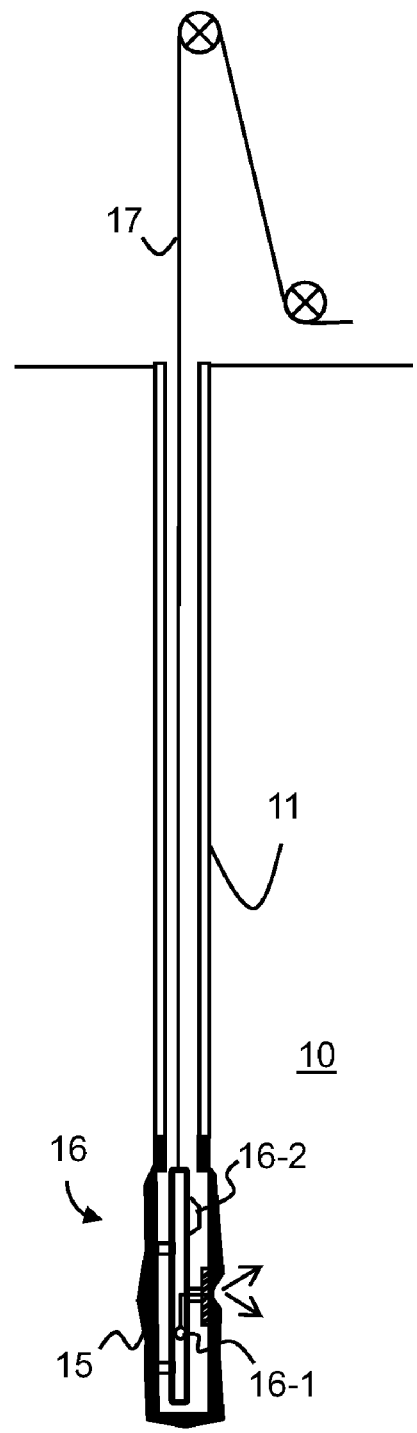
Fig. 1A
(Prior Art)
Fig. 1B
(Prior Art)

METHOD FOR DETERMINING FORMATION PARAMETER

FIELD OF THE INVENTION

The invention relates methods for determining parameters representative of formation properties and formation fluid properties of subterranean reservoirs, particularly hydrocarbon reservoirs. More specifically, the invention relates methods for measuring formation parameters at the point of a localized injection of fluid.

BACKGROUND

In the course of assessing and producing hydrocarbon bearing formations and reservoirs, it is important to acquire knowledge of formation and formation fluid properties which influence the productivity and yield from the drilled formation. Typically such knowledge is acquired by methods generally referred to as "logging".

Logging operations involve the measurement of a formation parameter or formation fluid parameter as function of location, or more specifically depth in a wellbore. Formation logging has evolved to include many different types of measurements including measurements based on acoustic, electro-magnetic or resistivity, and nuclear interactions, such as nuclear magnetic resonance (NMR) or neutron capture.

NMR measurements are commonly used in the wellbore to probe the NMR decay behavior of the stationary fluid in the reservoir rock. During these measurements, magnetic fields are established in the formation using suitably arranged magnets. The magnetic fields induce nuclear magnetization, which is flipped or otherwise manipulated with on-resonance radio frequency (RF) pulses. NMR echoes are observed, and their dependence on pulse parameters and on time is used to extract information about the formation and the fluids in it.

In particular, NMR has been used in the oilfield industry to obtain information and parameters representative of bound fluids, free fluids, permeability, oil viscosity, gas-to-oil ratio, oil saturation and water saturations. All these parameters can be derived from measurements of spin-spin relaxation time, often referred to as T2, spin-lattice relaxation time (T1), and self-diffusion coefficient (D) of the molecules containing hydrogen contained in formation fluids.

On the other hand, fluids are routinely sampled in the well bore with the help of so-called formation testers or formation fluid sampling devices. An example of this class of tools is Schlumberger's MDT™, a modular dynamic fluid testing tool. Such a tool may include at least one fluid sample bottle, a pump to extract the fluid from the formation or inject fluid into the formation, and a contact pad with a conduit to engage the wall of the borehole. When the device is positioned at a region of interest, the pad is pressed against the borehole wall, making a tight seal and the pumping operation begins.

When specifically attempting to inject rather than extract fluid from the formation, a testing tool may require modifications such as described for example in the co-owned U.S. Patent Application Publication No. 2006/0000606. The tool described therein is a formation tester for open hole formations incorporating a drill bit to drill through the mudcake which accumulates on the wall of the well bore or through zones damaged or contaminated by the drilling process. The tool as described in U.S. Publication No. 2006/0000606 is capable of injecting fluid into the formation surrounding wellbore for various purposes such as fracturing the formation near the wellbore.

It is further well established to mount logging tools on either dedicated conveyance means such as wireline cables or coiled tubing (CT) or, alternatively, on a drill string which carries a drill bit at its lower end. The latter case is known in the industry as measurement-while-drilling (MWD) or logging-while-drilling (LWD). In MWD and LWD operations, the parameter of interest is measured by instruments typically mounted close behind the bit or the bottom-hole assembly (BHA). Both logging in general and LWD are methods known as such for several decades and hence are believed to require no further introduction.

Also known for as many as three decades are measurements broadly referred to as log-inject-log or LIL measurements. From their inception as exemplified by U.S. Pat. No. 3,562,523 issued to Richardson and Wyman, LIL based methods have evolved into many variants.

However, the basic principle of LIL can still be seen as including a sequence of steps starting with the use of a first drilling fluid system, which invades the formation at a first time and then logging the invaded formation for the desired parameter. In a subsequent step, the composition of the drilling fluid is changed and this new fluid is circulated. After the new fluid has invaded the rock formation, the logging operation is repeated. The second measurement thus registers the change in the value or spatial distribution of the parameter in question.

Known variants of the LIL methods are described for example in U.S. Pat. No. 3,748,474 to Murphy, U.S. Pat. No. RE 28,963 to Fertl and Reynolds and in U.S. Pat. No. 4,987,368 to Vinegar. Further reference to LIL can be found in U.S. Pat. No. 5,796,252 to Kleinberg et. al. The latter document provides also further insight into and details of state-of-the-art NMR logging.

In a paper prepared for presentation at the SPWLA 1st Annual Middle East Regional Symposium, Apr. 15-19, 2007, Gilles Cassou, Xavier Poirier-Coutansais and one of the inventors of the present invention, Raghu Ramamoorthy, demonstrate that the combination of advanced-NMR fluid typing techniques with a dual-packer fluid pumping module can greatly improve the estimation of the saturation parameter in carbonate rocks. The ability to perform 3D-NMR stations immediately before and after pump-outs yields both the water and oil saturations (Sw,Sxo) independently of lithology, resistivity, and salinity in a complex carbonate environment.

In view of the known art, it is therefore seen as one object of the invention to improve and enhance known methods for characterizing formations using fluid injection into the formation. It is seen as another object to provide more and better methods of determining characteristic formation and formation fluid properties to monitor the performance of fluid for the purpose of increasing hydrocarbon production from these formations.

SUMMARY

According to one aspect, the invention provides a method of evaluating a reservoir treatment applied to a subterranean formation including the steps of injecting from a tool body suspended into a well at an injection location a known volume of fluid into the formation, performing a logging operation sensitive to a change of fluid content at several measuring points below and above the injection location; and using results of the logging operation to determine a depth profile along said well of a parameter related to fluid content.

The profile should include sufficient data points to locate a transition section where fluid content changes from injected to replaced fluid in the formation or more preferably sufficient data points to determine the slope, shape or contour of the profile in the transition section. The accurate knowledge of the location and even more so of the shape of the profile in the transition section from the formation region completely swept with the exception of immovable residues of the replaced fluid to the formation region where the replaced fluid maintains its original saturation value can be used to derive important formation parameters, such as directional and/or relative permeabilities.

The profile most preferably measured is known as saturation profile, though any parameter providing equivalent information on the spatial distribution of fluid contents can be used. The preferred methods used to acquire the depth log of the parameter are methods based on magnetic resonance which at the current state of art provides the best defined and confined measuring volume. Thus it is easier to produce the accurate log required for variants of the invention.

The injection of the fluid can be greatly facilitated by preparing the injection point, for example by drilling a small lateral hole to by-pass layers of the formation damaged during the drilling of the well and thus provide a clean and well defined surface for the injection.

The preferred method of deriving or determining further parameters from the log measurement involves the use of modeling and matching such formation parameters until the modeled injection reproduces the measured values.

The injected fluid is best provided from a reservoir within the body of the tool. It is believed that a smaller amount of injected fluid yields more accurate results. Thus a volume of injected fluid of 20 gal or less is most preferred.

These and other aspects of the invention are described in greater detail below making reference to the following drawings.

BRIEF DESCRIPTION OF THE FIGURES

FIG. 1A illustrates a conventional drilling operation;

FIG. 1B illustrates a step of a logging operation in accordance with an example of the present invention;

DETAILED DESCRIPTION

Figure 2A:
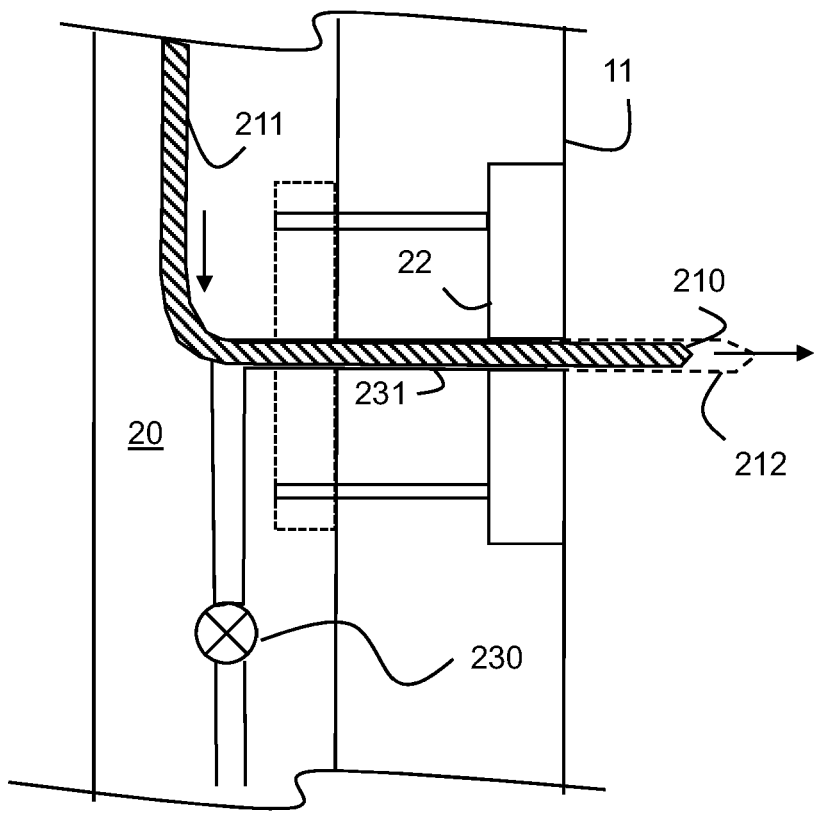
FIGS. 2A to 2D show different stages of a logging operation in accordance with an example of the present invention in detail.
Figure 2B:
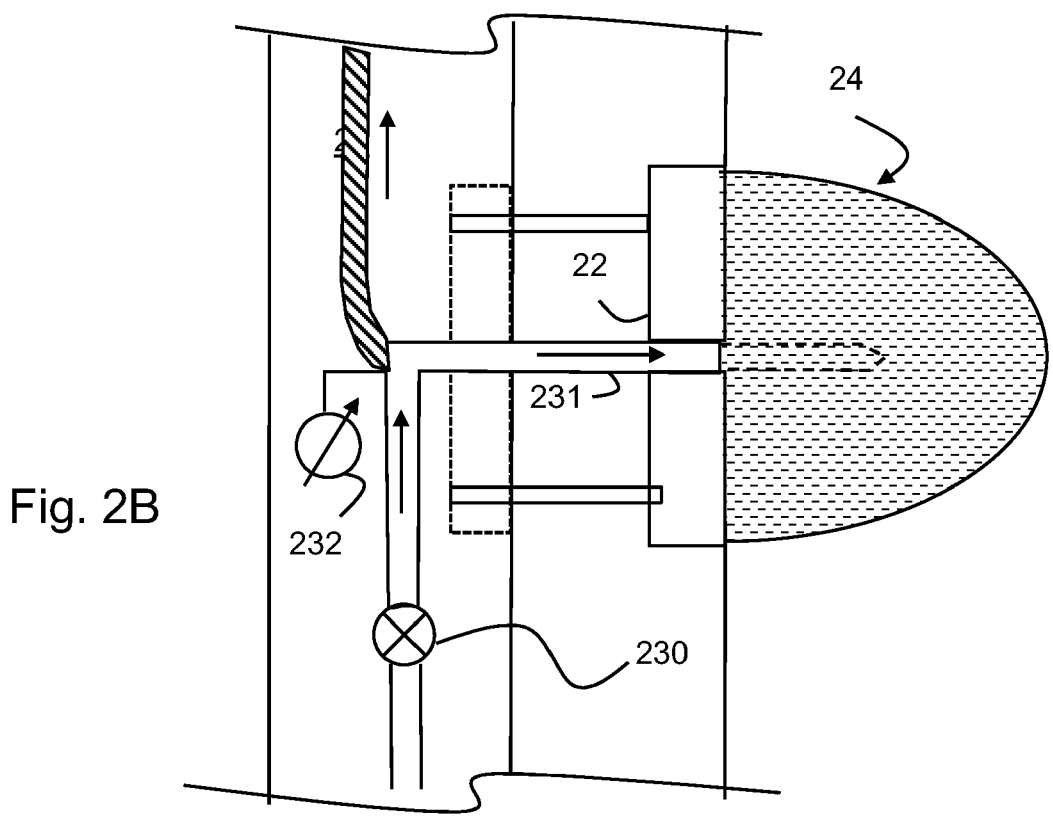

In FIG. 1A, a well 11 is shown in the process of being drilled through a formation 10. A drill string 12 is suspended from the surface by means of a drilling rig 13. A drill bit 12-1 is attached to the bottom of the drill string 12.

While drilling, a drilling fluid is circulated through the drill string 12 and the drill bit 12-1 to return to the surface via the annulus between the wall of the well 11 and the drill string 12. During this process, part of the drilling fluid invades a shallow zone 15 around the borehole 11 thus contaminating the formation fluid.

After completing the drilling through a hydrocarbon bearing formation, a wireline tool 16 as shown in FIG. 1B is lowered into the well 11 using a wireline cable 17. In the example as illustrated, the wireline tool includes a formation testing device 16-1 combined with a formation drilling device and an NMR-based tool 16-2 both mounted on one toolstring 16. Such tools have been described in the prior art. To perform a measurement in accordance with an example of the present invention, the CHDT™ open hole drilling and testing tool as offered commercially by Schlumberger can be combined with the CMR™ Combinable Magnetic Resonance tool of the same provider into one toolstring.

The operation of this combined toolstring in a downhole operation is illustrated schematically in FIGS. 2A-2D.

The combined CHDT and CMR body 20 of the downhole logging tool includes a small formation drill bit 210 mounted on an internal flexible drill string 211. While the tool is kept stationary using the pad 22 and counterbalancing arms (not shown), the flexible drill 210 can be used to drill a small side bore 212 into the formation surrounding the well 11. Once the side bore 212 has reached the desired lateral depth, the drill 210, 211 is withdrawn. Then the pump module 230 of the CHDT tool is activated and from an internal reservoir (not shown) a predetermined volume of testing fluid is injected at a known flow rate through the flow line 231 into the formation. The region 24 of the formation which is filled with the injected volume is indicated as hatched area in FIGS. 2B-2D. A pressure sensor 232 can be used to monitor the pressure profile during the injection.

Figure 2C:
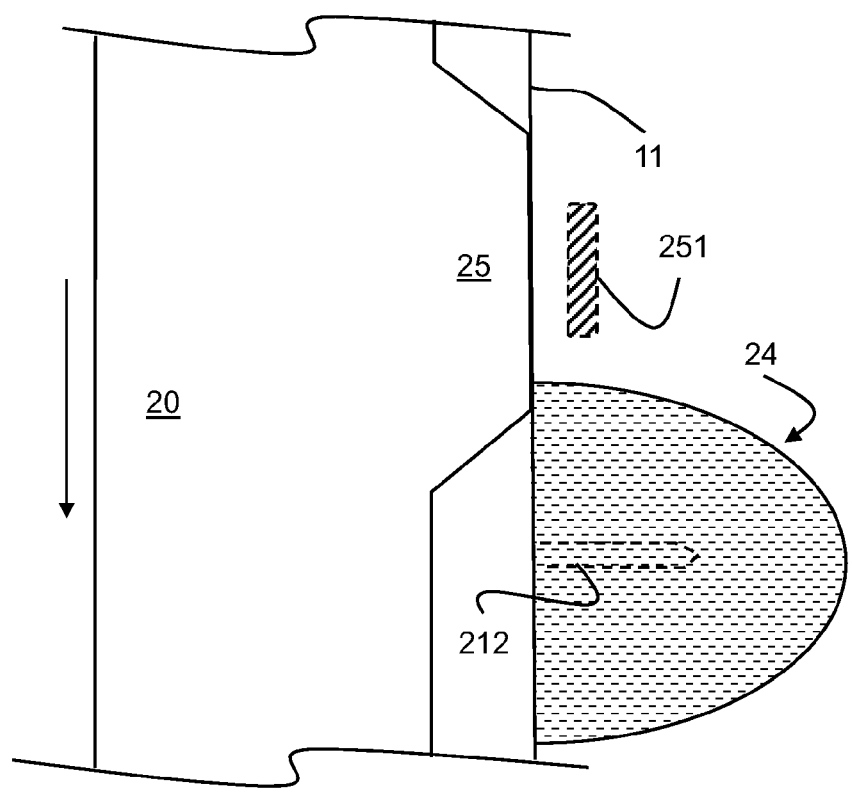
Figure 2D:
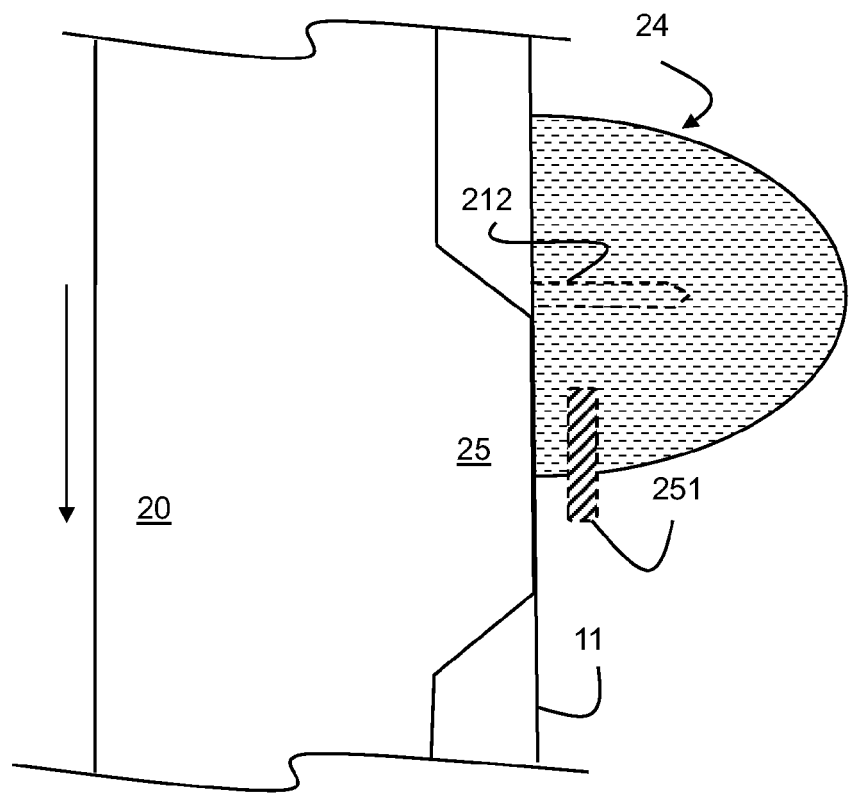

After the injection, the tool string 20 is either lifted or lowered to take a depth log of the saturation with the CMR tool 25. The tool is shown in FIGS. 2C and 2D as having a finite sensitive region 251 from which it measures the response to the NMR pulses generated. The exact size and distance from the tool of this sensitive region 251 is a function of the tool design. It can be regarded as part of the tool response function and knowledge of this response function can be applied to interpret the measurements to arrive at more accurate results. In FIG. 2D the same tool is shown after having almost passed the region 24 of injected fluid. In the course of the measurement, the sensitive region 251 traverses the entire injected zone and as well as locations above and below it.

It is worth noting that the nature of the logging measurement can vary. For the purpose of the present invention it is important that the chosen methods yields a precise depth (as measured along the axis of the well) log of a parameter indicative of the amount of injected fluid across the injected zone as "visible" from the well. The use of an NMR-based measurement as suggested by the above example is preferred because its sensitive region is very effectively confined resulting in an accurate depth resolved log of saturation values.

Alternatively other methods can be applied for the same purpose, including for example resistivity or dielectric dispersion logging tools such as Schlumberger's RST to which provides a carbon/oxygen ratio or the ADT™ tool, both of which however at the current state of art have a less defined tool response function for the intended measurement.

Figure 3:
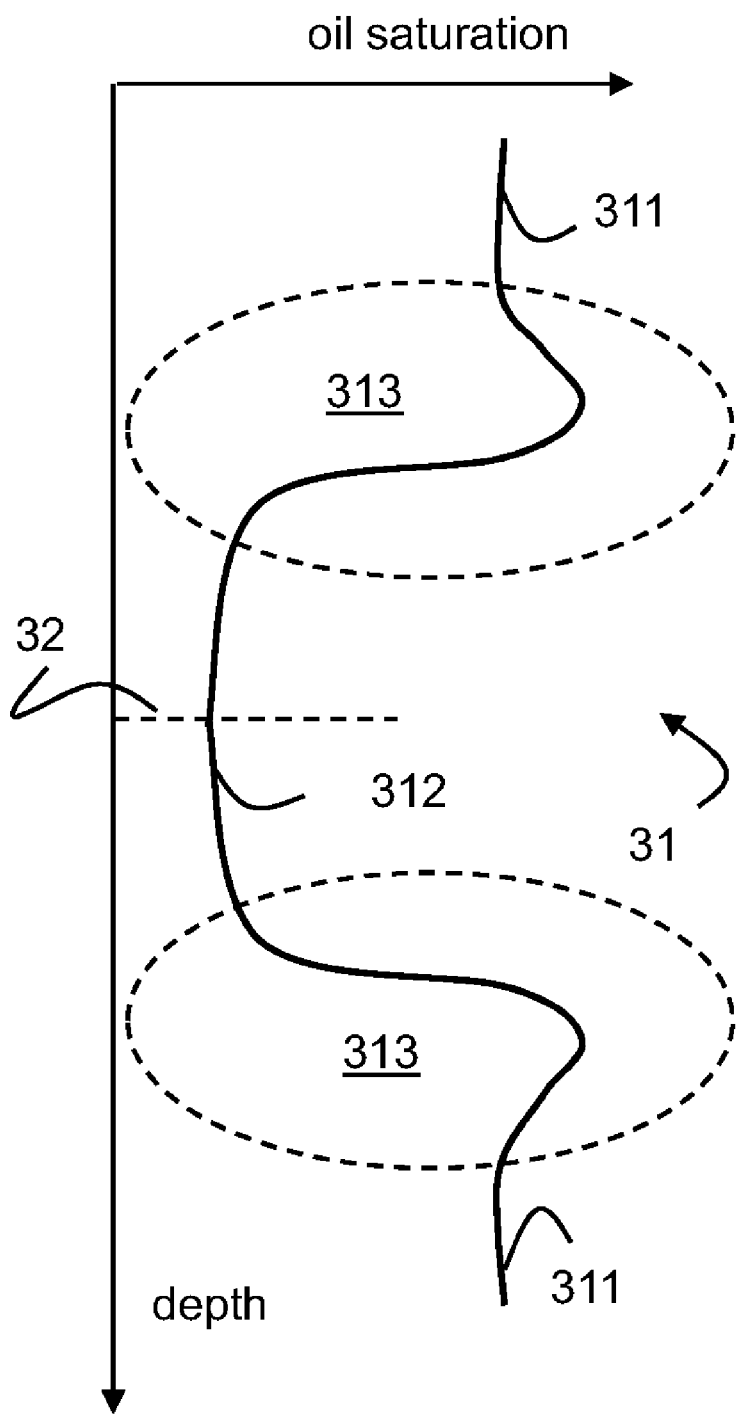
FIG. 3 illustrates a measurement in accordance with an example of the present invention.

The logging measurement as performed by the CMR tool can be transformed into a saturation-vs-depth profile using standard processing of its received signals. A simplified example of such a profile is shown in FIG. 3. The oil saturation profile 31 is shown to drop from the original saturation 311 to the level of irreducible oil in the region 312 where the injected fluid completely replaced the movable oil. It becomes clear from the drawing that the logging measurement has to be a high resolution measurement in order to accurately measure the profile, in particular the two transition sections as marked by the encircled areas 313. It is seen as an aspect of the present invention to extract relevant formation parameters from the measurement of the location and shape of these transition sections of the profile. For the purpose of the present invention, the resolution of the measurement has therefore to be such that the change in saturation induced by the injection can be measured accurately enough to determine at least approximately the depth location of the change in saturation in the transition from invaded zone to original formation, but preferably the approximate or accurate slope of the profile across the transition zone and hence across the injection area.

The accuracy required for such measurements may readily surpass the accuracy provided by single point measurements of the logging tool, which typically return a single value representing an average of the sensitive region 251. In the example of the CMR tool the vertical length of the sensitive region 251 (of FIG. 2) is 7.5-in [15 cm]. As explained further below the exact geometry of the invaded area 24 depends on a number of parameters including the volume of injected fluid, viscosities of replacing and replaced fluid, porosity of the formation, the ratio of vertical permeability kv and horizontal permeability kh, and relative permeability krel of replaced to replacing fluid. In the present example the saturation profile was determined with measuring point every 3.in [7 cm], which in combination with a deconvolution of measurement using the known tool response was found sufficient to determine the profile even for a relatively small volume of less than 20 or 10 gal of injected fluid.

In order to control the location of the sensitive region as the tool moves in the well, it may further be necessary to determine or control the tool orientation or azimuth. In the present example, this is done be adding an inclinometer to the tool string.

Once a profile 31 across the invaded region 24 of the saturation or any related or equivalent parameter is known, several important parameters can be determined relating to the formation and/or the effectiveness of the injected fluid for its intended purpose, which could be for example enhanced oil recovery (EOR) or sweep efficiency.

It is possible to derive certain of such parameters analytically from the profile or points of the profile using either analytical methods or modeling methods the later being aimed at matching the measurements made with a model as provided for example by a reservoir modeler such as Schlumberger's Eclipse® software suite. In the analytical case and by making some simplifying assumptions, the ratio of kh/kv can be linked for example to the ratio of both main axes of an ellipsoid, which can be easily calculated once the length of the invaded zone along the line of measurement and the injected volume and the formation porosity and residual saturations are known. Further information about the relative permeability can be extracted from the slope of the profile in the transition sections 232, which are believed to be shaped to a large extent by this parameter.

As however in a more accurate model many of the parameters are linked, it will be in often preferable to attempt to match the injection history (including the volume and properties of the injected fluid, the injection flow rates and the pressure curves during injection) to the measured profile with the assistance of modeling software. The model typically includes all previous knowledge of the section of the formation around the injection depth. The preferred source of such knowledge is a prior standard logging operation for saturations, density, porosity and other relevant parameters. This prior logging operation is used a starting state or baseline for the modeling, while the end state is represented by the logging operation as described above. Through the modeling or simulation process, a best match can be established simultaneously for many of the unknown parameters such as vertical permeability kv and horizontal permeability kh, and relative permeability krel of replaced and replacing fluid.

The invention as described above signifies an important and clear improvement over the conventional and well-established log-inject-log methods. By first measuring and then evaluating an accurate profile of saturation or a similar parameter over a relatively short section of the well, the invention enables the determination of important formation and parameters not immediately accessible through the known log-inject-log (LIL) methods.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative processes, one skilled in the art will recognize that the system may be embodied using a variety of specific procedures and equipment and could be performed to evaluate widely different types of applications and associated geological intervals. Accordingly, the invention should not be viewed as limited except by the scope of the appended claims.

What is claimed is:

1. A method of evaluating a reservoir treatment applied to a subterranean formation including the steps of
   injecting from a tool body suspended into a well at an injection location a known volume of fluid into the formation;
   performing a logging operation sensitive to a change of fluid content at several measuring points below and above said injection location; and
   using results of said logging operation to determine a depth profile along said well of a parameter related to fluid content, wherein said profile includes sufficient data points to locate a transition section where fluid content changes from injected to replaced fluid content in said formation.

2. The method of claim 1 wherein the profile includes sufficient data points to define a slope of said profile in the transition section.

3. The method of claim 1, further comprising the step of drilling a hole from the well into the formation prior to the injection of the fluid.

4. The method of claim 2, further comprising the step of using the profile to determine one or more further parameters characterizing the formation or fluids in the formation.

5. The method of claim 4, wherein the one or more further parameters include directional and/or relative permeabilities or functions thereof.

6. The method of claim 3, further comprising the step of modeling the injection into the formation and matching results to the modeling with the results of the logging operation.

7. The method of claim 1, wherein the injection includes the use of a reservoir of fluid located in the body of the tool.

8. The method of claim 1, wherein the logging operation includes the use of a magnetic resonance tool.

9. The method of claim 1, further comprising the step of using a known tool response function to increase the accuracy of determination of the depth profile.

* * * * *